(12) United States Patent
Kumar et al.

(10) Patent No.: US 8,185,375 B1
(45) Date of Patent: May 22, 2012

(54) WORD ALIGNMENT WITH BRIDGE LANGUAGES

(75) Inventors: Shankar Kumar, Mountain View, CA (US); Franz J. Och, Mountain View, CA (US); Wolfgang Macherey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 878 days.

(21) Appl. No.: 11/781,824

(22) Filed: Jul. 23, 2007

Related U.S. Application Data

(60) Provisional application No. 60/920,281, filed on Mar. 26, 2007.

(51) Int. Cl.
*G06F 17/28* (2006.01)
(52) U.S. Cl. ............... 704/4; 704/5; 704/7; 704/8; 704/9
(58) Field of Classification Search .................. None
See application file for complete search history.

(56) References Cited

U.S. PATENT DOCUMENTS

| | | | | |
|---|---|---|---|---|
| 6,131,082 | A * | 10/2000 | Hargrave et al. | 704/7 |
| 6,321,189 | B1 * | 11/2001 | Masuichi et al. | 704/7 |
| 6,321,191 | B1 * | 11/2001 | Kurahashi | 704/8 |
| 7,454,326 | B2 * | 11/2008 | Marcu et al. | 704/2 |
| 7,620,538 | B2 * | 11/2009 | Marcu et al. | 704/2 |
| 2004/0122656 | A1 * | 6/2004 | Abir | 704/4 |
| 2005/0010421 | A1 * | 1/2005 | Watanabe et al. | 704/277 |

OTHER PUBLICATIONS

Brown, et al., "The Mathematics of Statistical Machine Translation: Parameter Estimation", 1993, New York.
Fiscus, "A Post-Processing System to Yield Reduced Word Error Rates: Recognizer Output Voting Error Reduction", 1997, California.
Macherey, "An Empirical Study on Computing Consensus Translations from Multiple Machine Translation Systems", Prague, 2007.
Matusov, "Symmetric Word Alignments for Statistical Machine Translation", Switzerland, 2004.
Och, et al., "A Systematic Comparison of Various Statistical Alignment Models", 2003, Germany.
Papineni, et al., "Bleu: A Method for Automatic Evaluation of Machine Translation", 2002, Philadelphia.
Borin, Lars, "You'll Take the High Road and I'll Take the Low Road: Using a Third Language to Improve Bilingual Word Alignment,". In COLING, 2000, pp. 97-103, Saarbrucken, Germany.
Brown et al., "The Mathematics of Statistical Machine Translation: Parameter Estimation," Computational Linguistics, 1993, vol. 19, No. 2, pp. 263-311.
Deng et al., "HMM Word and Phrase Alignment for Statistical Machine Translation," HLT-EMNLP 2005, Vancouver, Canada, 8 pages.

(Continued)

*Primary Examiner* — Leonard Saint Cyr
(74) *Attorney, Agent, or Firm* — Harness, Dickey & Pierce, P.L.C.

(57) ABSTRACT

Systems, methods, and computer program products are provided for statistical machine translation. In some implementations a method is provided. The method includes receiving multi-lingual parallel text associating a source language, a target language, and one or more bridge languages, determining an alignment between the source language and the target language using a first bridge language that is distinct from the source language and the target language, and using the determined alignment to generate a candidate translation of an input text in the source language to the target language.

23 Claims, 4 Drawing Sheets

OTHER PUBLICATIONS

Fraser et al., Semi-Supervised Training for Statistical Word Alignment. Proceedings of the 21$^{st}$ International Conference on Computational Linguistics and 44$^{th}$ Annual Meeting of the ACL, 2006, Sydney, Australia, pp. 769-776.

Matusov et al., Symmetric Word Alignments for Statistical Machine Translation. In COLING, 2004, Geneva, Switzerland, 7 pages.

Och et al., "A Systematic Comparison of Various Statistical Alignment Models," Association for Computational Linguistics, 2003, vol. 29, No. 1, pp. 19-51.

Och et al., "The Alignment Template Approach to Statistical Machine Translation," Association for Computational Linguistics, 2004, vol. 30, No. 4, pp. 417-449.

Vogel et al., "HMM-Based Word Alignment in Statistical Translation," in COLING, 1996, Copenhagen, Denmark, pp. 836-841.

Schafer et al., "Inducing Translation Lexicons via Diverse Similarity Measures and Bridge Languages," In CoNLL, 2002, Taipei, Taiwan, 7 pages.

Ayan et al., "A Maximum Entropy Approach to Combining Word Alignments," Proceedings of the Human Language Technology Conference of the North American Chapter of the ACL, New York, Jun. 2006, pp. 96-103.

Bangalore et al., "Bootstrapping Bilingual Data using Consensus Translation for a Multilingual Instant Messaging System," in COLING, 2002, Taipei, Taiwan, 7 pages.

Brants et al., "Large Language Models in Machine Translation," in EMNLP, Prague, Czech Republic, 2007, pp. 858-867.

Filali et al., "Leveraging Multiple Languages to Improve Statistical MT Word Alignments," IEEE Workshop on Automatic Speech Recognition and Understanding, San Juan, Puerto Rico, 2005, 6 pages.

Fraser et al., "Measuring Word Alignment Quality for Statistical Machine Translation," Technical Report ISI-TR-7616, ISI/University of Southern California, 2006, pp. 293-303.

Ittycheriah et al., "A Maximum Entropy Word Aligner for Arabic-English Machine Translation," Proceedings of Human Language Technology Conference and Conference on Impirical Methods in Natural Language Processing (HTL/EMNLP), Vancouver, Oct. 2005, pp. 89-96.

Koehn, "Statistical Significance Tests for Machine Translation Evaluation," in EMNLP, Barcelona, Spain, 2004, 8 pages.

Kumar et al., "Minimum Bayes-Risk Decoding for Statistical Machine Translation," In HLTNAACL, Boston, MA, 8 pages, 2004.

Macherey et al., "An Empirical Study on Computing Consensus Translations from Multiple Machine Translation Systems," in EMNLP, Prague, Czech Republic, 2007, pp. 986-995.

Mann et al., "Multipath Translation Lexicon Induction via Bridge Languages," In NAACL, Pittsburgh, PA, 2001, 8 pages.

Martin et al., "Word Alignment for Languages with Scarce Resources," ACL Workshop on Building and Using Parallel Texts, Ann Arbor, MI, 10 pages, 2005.

Matusov et al., "Computing Consensus Translation from Multiple Machine Translation Systems Using Enhanced Hypotheses Alignment," In EACL, Trento, Italy, 2006, 8 pages.

Moore, "A Discriminative Framework for Bilingual Word Alignment," In EMNLP, Vancouver, Canada, 2005, 8 pages.

Och, "Minimum Error Rate Training in Statistical Machine Translation," Proceedings of the 41$^{st}$ Annual Meeting of the Association for Computational Linguistics, Jul. 2003, pp. 160-167.

Resnik et al., "Creating a Parallel Corpus from the "Book of 2000 tongues"," Text Encoding Initiative 10$^{th}$ Anniversary User Conference, Providence, RI, 1997, pp. 1-14.

Sim et al., "Consensus Network Decoding for Statistical Machine Translation System Combination," IEEE International Conference on Acoustics, Speech, and Signal Processing, Honolulu, HI, 2007. 4 pages.

Simard, "Text-Translation Alignment: Three Languages Are Better Than Two," EMNLP-VlC, College Park, MD, 1999, 10 pages.

Ueffing et al., "Word-Level Confidence Estimation for Machine Translation using Phrase-Based Translation Models," EMNLP, Vancouver, Canada, 2005, pp. 763-770.

\* cited by examiner

WORD ALIGNMENT WITH BRIDGE LANGUAGES

CROSS-REFERENCE TO RELATED APPLICATIONS

This application claims the benefit under 35 U.S.C. §119 (e) of U.S. Provisional Patent Application No. 60/920,281, entitled Improving Word Alignment with Bridge Languages, to Shankar Kumar, Franz J. Och, and Wolfgang Macherey, filed on Mar. 26, 2007. The disclosure of the above application is incorporated herein by reference in its entirety.

BACKGROUND

This specification relates to statistical machine translation.

Manual translation of text by a human operator can be time consuming and costly. One goal of machine translation is to automatically translate text in a source language to corresponding text in a target language. There are several different approaches to machine translation including example-based machine translation and statistical machine translation. Statistical machine translation attempts to identify a most probable translation in a target language given a particular input in a source language. For example, when translating a sentence from French to English, statistical machine translation identifies the most probable English sentence given the French sentence. This maximum likelihood translation can be written as:

$$\arg\max_{e} P(e \mid f)$$

which describes the English sentence, e, out of all possible sentences, that provides the highest value for P(e|f). Additionally, Bayes Rule provides that:

$$P(e \mid f) = \frac{P(e)P(f \mid e)}{P(f)}.$$

Using Bayes Rule, this most likely sentence can be re-written as:

$$\arg\max_{e} P(e \mid f) = \arg\max_{e} P(e)P(f \mid e).$$

Consequently, the most likely e (i.e., the most likely English translation) is one that maximizes the product of the probability that e occurs and the probability that e would be translated into f (i.e., the probability that a given English sentence would be translated into the French sentence).

SUMMARY

Systems, methods, and computer program products are provided for statistical machine translation. In general, in one aspect, a method is provided. The method includes receiving multi-lingual parallel text associating a source language, a target language, and one or more bridge languages, determining an alignment between the source language and the target language using a first bridge language that is distinct from the source language and the target language, and using the determined alignment to generate a candidate translation of an input text in the source language to the target language. Other embodiments of this aspect include corresponding systems, apparatus, computer program products, and computer readable media.

Implementations of the aspects can include one or more of the following features. Determining the alignment using the first bridge language can include determining a first alignment between the source language and the first bridge language, determining a second alignment between the bridge language and the target language, and determining the alignment between the source language and the target language using the first and second alignments. The aspects can further include determining a plurality of alignments between the source language and the target language using a plurality of respective bridge languages, using each of the determined plurality of alignments to generate respective candidate translations of the input text, and determining a consensus translation using the candidate translations.

The aspects can further include determining a combined alignment using two or more alignments determined using two or more bridge languages and using the combined alignment to generate a candidate translation of the input text. Determining the alignment using the first bridge language can further include determining a first posterior probability matrix associated with an alignment from the source language to the bridge language, determining a second posterior probability matrix associated with an alignment from the bridge language to the target language, determining a third posterior probability matrix associated with an alignment from the source language to the target language as a function of the first posterior probability matrix and the second posterior probability matrix, and identifying a maximum alignment probability using the third posterior probability matrix.

Particular embodiments of the subject matter described in this specification can be implemented to realize one or more of the following advantages. The word alignment for a particular source and target language can be improved using bridge languages. In particular, when less parallel data is available for the source and target languages, bridge translations using languages in which there is a greater amount of parallel data between either source-bridge, target-bridge, or both can yield a better alignment. Improved alignment quality can lead to improved translation quality. More than one alignment between the source and target language sentences can be generated using different bridge languages.

Translations generated using multiple bridge languages are uncorrelated. These provide a diverse pool of hypotheses for hypothesis combination, which in turn can produce a hypothesis with higher translation quality. Additionally, when the bridge language has the same amount of data as the source/target, alignment errors in the source-target language pair are generally not correlated to the alignment errors in source-bridge or bridge-target pairs. Consequently, source-target alignment errors can be corrected using source-bridge and bridge-target word alignments.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
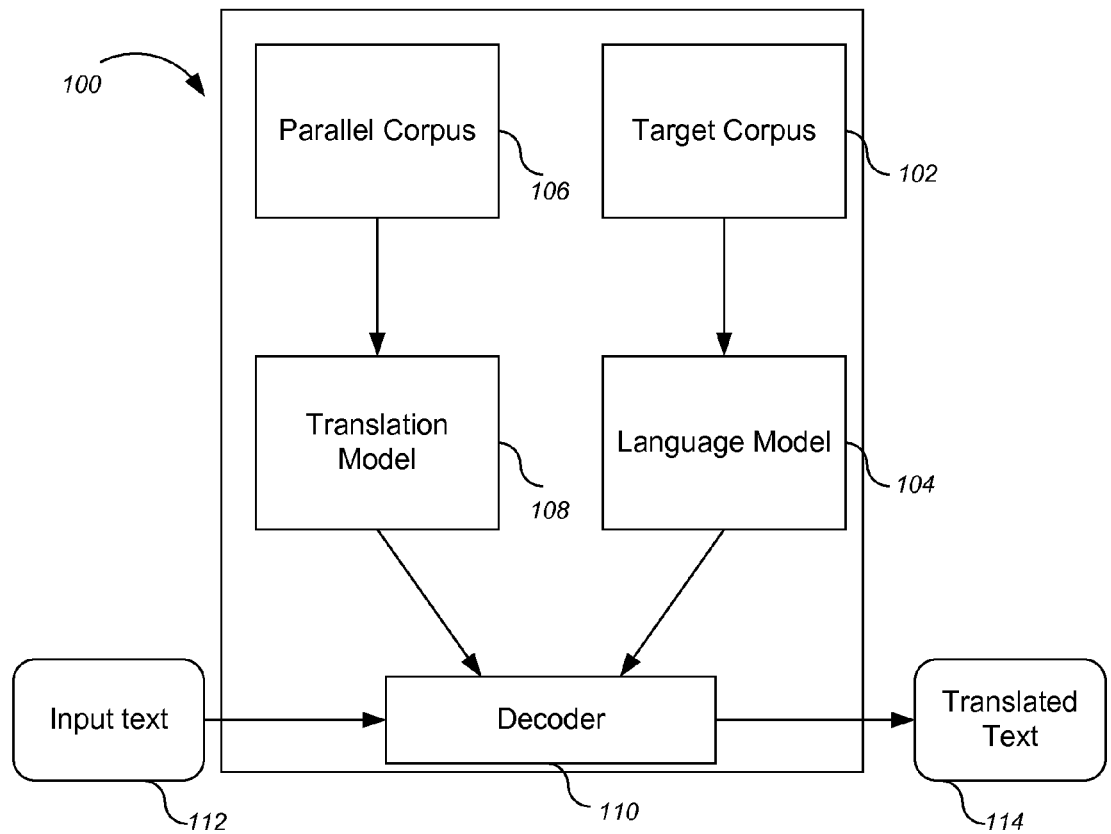
FIG. 1 is a block diagram of an example machine translation system.

FIG. 1 is a block diagram of an example machine translation system 100. Machine translation system includes a target corpus 102, a language model 104, a parallel corpus 106, a translation model 108, and a decoder 110. Providing input text 112 to the translation system 100 produces translated text 114.

The target corpus 102 provides a collection of text in a target language (e.g., English), which is used to train the language model 104. The target corpus 102 can include a number of different sources of text, including, e.g., web pages and news articles. In some implementations, the target corpus 102 includes text on the order of tens to hundreds of billions of words, or even more. One such corpus is the Linguistic Data Consortium ("LDC") Web 1T 5-gram Version 1 corpus, LDC Catalog No.: DC2006T13, ISBN: 1-58563-397-6, contributed by Google Inc. This corpus uses approximately one trillion word tokens (including individual words, punctuation, and markers identifying a beginning and end of individual sentences) of text from publicly accessible Web pages.

The language model 104 identifies the probability that a particular string (e.g., a phrase, sentence, or collection of sentences) in the source language occurs. Thus, for English, the language model 104 identifies the probability that a particular string in English occurs. To identify the probability of a particular string (e.g., sentence, phrase) occurring, the language model 104 calculates the number of times the string occurs in the target corpus 102 divided by the total number of strings in the target corpus 102. For example, if the phrase "The red wheelbarrow" occurs 53,000 times in a corpus of 100,000,000 words, the probability equals:

$$P(\text{The red wheelbarrow}) + \frac{53,000}{100,000,000} = 0.00053.$$

However, a number of possible strings will have a probability of zero since they are not found within the target corpus 102. Therefore, in some implementations, the probability of a particular string is calculated as a function of the probabilities of sub-string components. One technique for representing sub-strings is by using n-grams. An n-gram is a sequence of n consecutive tokens. An n-gram has an order, which is the number of tokens in the n-gram. For example, a 1-gram (or unigram) includes one token; a 2-gram (or bigram) includes two tokens.

An n-gram language model uses n-gram sub-strings to calculate the probability of a string. The probably of a given string can be calculated as a product of n-gram conditional probabilities. The conditional probability for a bigram, represented $P(y|x)$, is the probability that word y follows word x. The conditional probabilities are generally determined empirically, according to relative frequencies in the target corpus 102. In the example above, the probability of the word y given x is given by:

$$P(y \mid x) = \frac{f(xy)}{f(x)},$$

where f(xy) is a frequency or a count of the occurrences of the string "xy" in the target corpus 102.

The probability for the string can be determined as a product of conditional probabilities. For example, to calculate P(The red wheelbarrow) using a bigram language model, the n-gram language model calculates:

P(The|<start>)P(red|The)P(wheelbarrow|red), where <start> is a marker representing the beginning of a sentence such that P(The|<start>) represents the probability that a sentence begins with "The".

This string probability can be generalized to:

$$P(e_1, \ldots, e_k) = P(e_1)P(e_2 \mid e_1) \ldots \prod_{i=n}^{k} P(e_i \mid e_{i-n+1}, \ldots, e_{i-1})$$

where $(e_1, \ldots, e_k)$ represent tokens in the string and n is the order of the largest n-gram allowed in the language model.

The parallel corpus 106 includes a collection of text in the source language (e.g., French) and a corresponding translation in one or more target languages (e.g., English). The parallel corpus 106 can include a number of different sources of text, including, e.g., web page and news article pairs where each pair includes text in the source language and the corresponding translated text in the target language. In another example, the parallel corpus 106 can include multi-lingual data. For example, United Nations proceedings are available which provide parallel translations in six languages.

The translation model 108 identifies the conditional probability of a particular source language string given a particular target string. Thus, for an English target language and a French source language, the translation model 108 identifies the probability P(f|e) of a French string f given an English string e. Translation models can be generated in a number of different ways. In some implementations, a number of parameters are estimated in order to determine P(f|e). For example, a translation model can be defined according to four parameters: t, n, d, and p (e.g., IBM Model 3 described, for example, P. F. Brown, V. J. Della Pietra, S. A. Della Pietra, and R. L. Mercer, *The Mathematics of Statistical Machine Translation: Parameter Estimation*, Computational Linguistics 19(2), 1993, which is incorporated by reference).

A translation parameter, t, provides a probability of producing a translated word from a target word, e.g., t(bonjour|hello). A fertility parameter, n, provides a probability that target word will produce n source words. For example, n(2|hello) represents the probability that the target word "hello" will produce exactly two French words. A distortion parameter, d, provides a probability associated with the position of a source word in a source sentence relative to the position of the corresponding target word in a target sentence. For example, d(3|5) represents the probability that the English word in position 5 of a sentence (e.g., the fifth word) will provide a French word in position 3 of a translated French sentence (e.g., the third word). Additionally, a parameter p provides a probability of the translation including a spurious word. A spurious word is a word that appears in the source language translation of a target language string that does not correspond to a target word in the target string.

The values of the model parameters can be estimated directly if the words in the source and target sentence pairs are all aligned. The term "alignment" will be used to refer to a data structure that represents a word-for-word connection between source and target words (e.g., that "hello" in one sentence aligns with "bonjour") in a pair of sentences. In some implementations, the alignment is simply a vector identifying positions of target words that various source words connect to. If the alignment is known, the parameter values can be estimated.

For a collection of sentences, the sentence pairs (F, E) can be represented as (F, E)=(($f_1$, $e_1$), ($f_2$, $e_2$) ... ($f_n$, $e_n$)). If A represents the alignment of all sentence pairs, then A=$a_1$, $a_2$, ..., $a_n$ where n is the number of sentences in the collection. If there is conditional independence between sentences in the collection, the alignment probability of the collection can be written as a product of the alignment probabilities of individual sentences: P (A, E|F)=P($a_1$, $e_1$|$f_1$) P($a_2$, $e_2$|$f_2$) ... P($a_n$, $e_n$|$f_n$). As a result of this factorization, the probability of a single sentence pair can be considered independently of the collection.

There can be more than one possible alignment for a sentence pair. For example, a sentence pair could have two equally likely alignments. Consequently, a probability can be calculated for a particular alignment. The alignment probability defines the likelihood that words are aligned in a particular way. The probability of a particular alignment given a particular sentence pair can be written P(a|e, f), where:

$$P(a \mid e, f) = \frac{P(a, f \mid e)}{P(f \mid e)}$$

where, $$P(f \mid e) = \sum_a P(a, f \mid e),$$

and where the P(a, f|e) is summed over all alignments a and represents the joint probability of an alignment and a source sentence, given a target sentence. Alignment, a, is represented by a single letter; however, it represents a matrix whose dimension can vary. Specifically, a is a matrix random variable, a specific value of which refers to a matrix of associations (e.g., links) between a specific source sentence and a specific paired target sentence. Columns correspond to source word position and rows to target word positions. An additional row and column may be labeled with the null word, in cases where there is no correspondence. The elements in the matrix are zeroes and ones, indicating the presence or absence of an association between the corresponding source and target sentence words. Depending on the alignment model used, constraints may be imposed on where in the matrix links can occur (e.g., whether a source word can map to multiple target words, whether words can map to a null word, etc.)

Therefore, P(a|e, f) can be described in terms of P(a, f|e). However, P(a, f|e) can also be described as a function of the parameter values. Thus, if the parameter values are known, the alignment probabilities can be directly calculated.

A particular alignment a refers to a specific alignment between a specific (f, e) pair, while P(a|e, f) is the posterior probability over possible alignments, again for the specific (f, e) pair. P(a|e, f) is described by parameters which can be estimated by some training procedure that iteratively learns the parameters by looping over a large number of (f, e) sentence pairs, using the current parameter values to achieve a better word alignment between each pair than was achieved in the previous iteration, then using that alignment to update the parameter values, then repeating. Additional details on alignment can be found, for example, in Franz Joseph Och and Hermann Ney, *A Systematic Comparison of Various Statistical Alignment Models*, Computational Linguistics, 29(1): 9—51, March 2003, which is incorporated by reference.

Consequently, to calculate P(a, f|e), the translation system calculates P(a, f|e). However, to calculate P (a, f|e) the parameter values are needed. Additionally, to obtain the parameter values, the system determines P(a|e, f), but to do that P(a, f|e) is again needed. Thus, a technique is used to solve for both parameter values and alignment probabilities substantially simultaneously.

An expectation-maximization ("μM") algorithm can be used to estimate parameter values and alignment probabilities using an iterative process until local optimum values are determined. An EM algorithm calculates maximum likelihood estimates of variables in probabilistic models. An EM algorithm is a two-step process. An expectation step calculates an expectation of the likelihood by including the variable values as if they were observed. A maximization step calculates the maximum likelihood estimates by maximizing the expected likelihood calculated in the expectation step. The process iterates between expectation and maximization steps where the values for the variable calculated in the maximization step are used for a next expectation step. The term "EM algorithm" refers to a class of related algorithms: the expectation and maximization steps provide a roadmap for developing specific EM algorithms. In some implementations, other techniques are used to find maximum likelihood estimates other than the EM algorithm, for example, gradient descent or conjugate gradient techniques.

Using a technique such as an EM algorithm, the translation model 108 is trained to determine a most likely parameter values and alignment probability for a give source and target language.

The decoder 110 applies the language model 104 and the translation model 108 to a given string (e.g., from input text 112) in order to produce a translated string (e.g., as translated text 114). In particular, the decoder 110 translates an observed sentence, f, (e.g., a French sentence) by seeking the sentence, e, (e.g., an English sentence) that maximizes the product of P(e) determined by the language model 104 and P(f|e) determined by the translation model 108.

Figure 2:
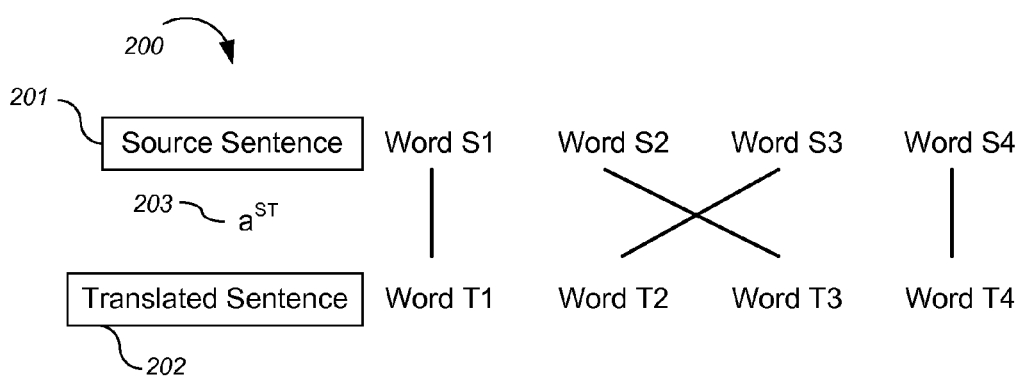
FIG. 2 illustrates an example of direct alignment between a source sentence and a translated sentence.

FIG. 2 illustrates an example of direct alignment 200 between a source sentence 201 and a translated sentence 202. The source sentence 201 includes a sequence of four words. Similarly, the translated sentence 202 includes a sequence of four words. The number of words in the translated sentence 202 is equal to the number of words in the source sentence 201 for simplicity. However, the translated sentence 202 could have a greater or a fewer number of words. For example, a particular word in the source sentence could correspond to multiple words in the translated sentence. Alternatively, a particular word in the source sentence can correspond to no word in the translated sentence.

The alignment 203 graphically illustrates word-to-word alignments between the source sentence 201 and the translated sentence 202. For example, word S1 of the source sentence 201 aligns directly to word T1 of the translated sentence 202. However, other words of the source sentence 201 align to translated words in different sentence positions. For example, word S2 in the source sentence 201 aligns with word T3 in position three of the translated sentence 202. Thus, the alignment illustrates that a translated sentence can have a different word ordering than the source sentence.

Alignments can be determined according to a particular alignment model. The alignment model introduces a hidden alignment variable, $a=a_1^J$. The alignment is a vector that specifies a mapping between source and target words within a string. An alignment term of $a_j=i$ indicates that the jth source word is linked to the ith target word. The alignment model assigns a probability, P(f, a|e), to the source sentence (e.g., in French) and alignment conditioned on the target sentence (e.g., in English). Given a French-English sentence-pair (f, e), a most likely word alignment is represented by:

$$\hat{a} = \arg\max_a P(f, a \mid e).$$

Where the $\hat{}$ notation indicates an alignment that is the most likely alignment for the sentence pair. In some implementations, an alternative technique, referred to as Maximum A-Posteriori ("MAP") estimation is used to find the most likely word alignment. MAP provides a statistical technique for estimating an unobserved quantity (e.g., alignment) given empirical data (e.g., source and target language pairs) as posterior probability matrices.

For a given alignment model, posterior probabilities can be computed as:

$$P(a_j = i \mid e, f) = \sum_a P(a \mid f, e)\delta(i, a_j),$$

where $i \in \{0, 1, \ldots, I\}$ and I is the length of the target sentence of the sentence pair. Additionally, $\delta$ is the Dirac-delta function where $\delta(a, b)=1$ if $a=b$ and $\delta(a, b)=0$ otherwise. The posterior probabilities provide the conditional probability of a particular alignment assigned according to the source and target language data. The assignment $a_j=0$ corresponds to a NULL (i.e., empty) alignment. This means that the source words do not align to any target words. The notation $(a_j=i|e, f)$ indicates that $a_j$ can take on multiple values. The probability $(a_j=i|e, f)$ identifies the probability that $a_j$ takes on some particular value i, where i can be varied depending on e, f. The posterior probabilities form a matrix of size $(I+1) \times J$, where entries along each column sum to one.

The MAP alignment for each source position, $j \in \{1, 2, \ldots, J\}$, is calculated according to the most likely posterior probability as:

$$a_{MAP}(j) = \arg\max_i P(a_j = i \mid e, f).$$

An example of MAP estimation is described in E. Matusov, R. Zens, and H. Ney. "Symmetric Word Alignments for Statistical Machine Translation," COLING 2004, Geneva, Switzerland, which is incorporated by reference.

Figure 3:
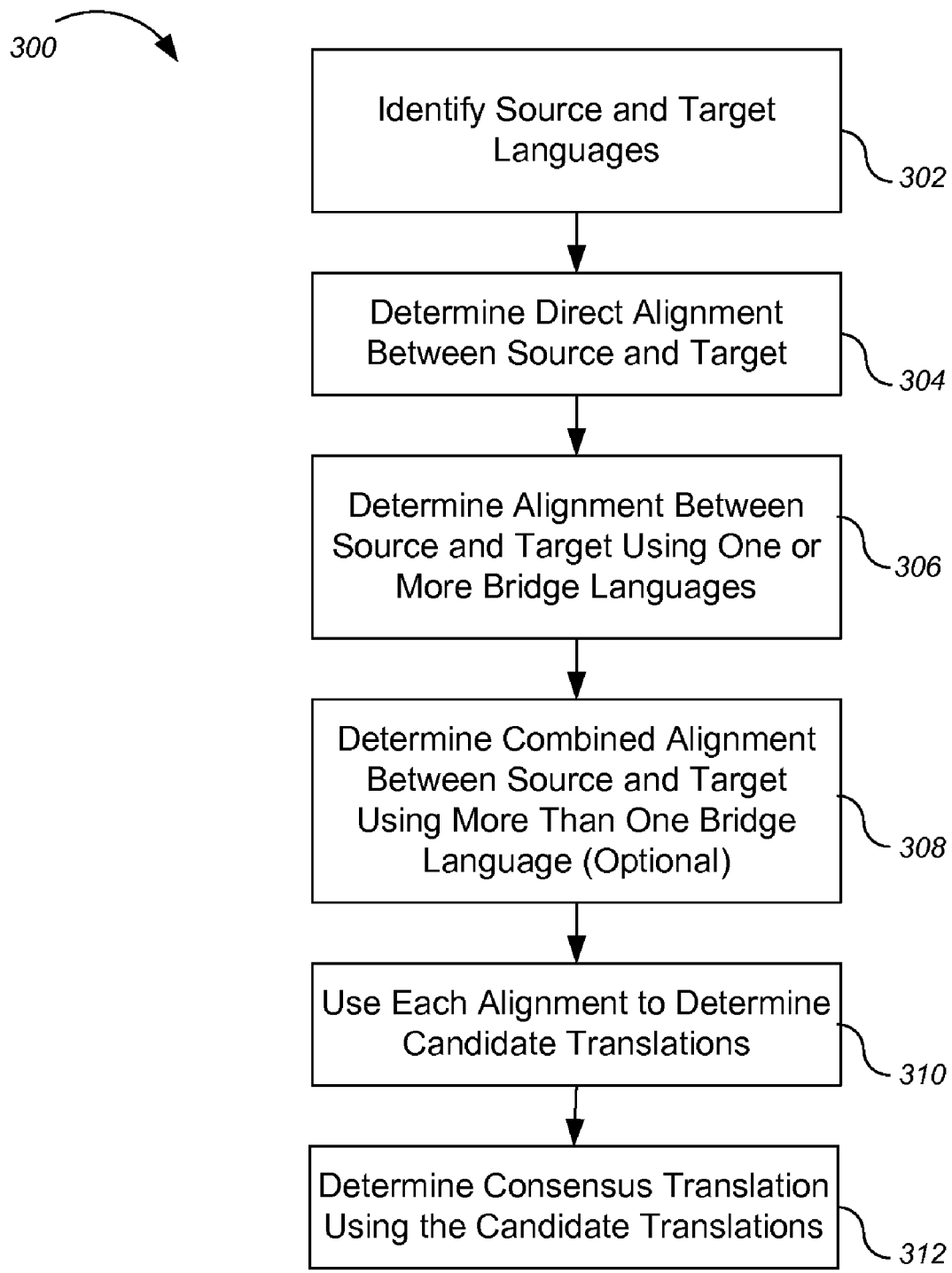
FIG. 3 is a flow chart illustrating an example method for providing translations using bridge languages.

FIG. 3 is a flow chart illustrating an example method 300 for providing translations using bridge languages. For convenience the method 300 will be described with reference to a system that performs the method 300.

The system identifies 302 a source and a target language. For example, when translating from French to English, the source language is French and the target language is English. The system determines 304 the direct alignment between sentence pairs of the source and target languages. Thus, for a translation from French to English, a particular probability for the alignment $a^{FE}$ is determined. The alignment can be determined directly as described above. Alternatively, the system can receive a particular alignment that was separately determined and supplied, e.g., to the translation system 100.

The system determines 306 an alignment between the source and target languages using one or more bridge languages. If a sentence includes corresponding translations in the source, target, and at least one other language, the system determines an alignment for the source and target languages as a function of the bridge languages.

For example, for a source language F (French), a target language E (English) and a bridge language G (German), the corresponding sentences can be represented as $f=f_1^J$, $e=e_1^I$ and $g=g_1^K$. A posterior probability estimate for a sentence-pair in FE: (f, e) is obtained using the posterior probability estimates for sentence pairs in FG: (f, g) and GE: (g, e). The word alignments for each sentence-pair are represented as $a^{FE}$, $a^{FG}$ and $a^{GE}$ respectively. The notation $a^{FE}$, for example, indicates that the alignment maps a position in F to a position in E. In other words, the alignment maps a particular word in the source language F to a position in a target language translation E. The posterior probability estimate for FE is expressed as a sum over all possible translations g in G and hidden alignments FG as follows:

$$P(a_j^{FE} = i \mid e, f) = \sum_{g,k} \{P(g \mid e, f)P(a_j^{FG} = k \mid g, e, f)P(a_j^{FE} = i \mid a_j^{FG} = k, g, e, f)\}.$$

In some implementations, the above expression is simplified according to particular assumptions. For example, it can be assumed that there is exactly one translation g in the bridge language G that corresponds to the sentence pair (f, e). Additionally, it can also be assumed that the alignments in FG do not depend on E. Given these assumptions, the posterior probability FE can be expressed in terms of posterior probabilities for GF and EG as:

$$P(a_j^{FE} = i \mid e, f) = \sum_{k=0}^{K} P(a_j^{FG} = k \mid g, f)P(a_k^{GE} = i \mid g, e).$$

As a result of the above expression, the posterior probability matrix for FE can be obtained using a simple matrix multiplication of posterior probability matrices for GE and FG. The posterior probability for $a^{GE}$ forms an $I \times K$ matrix and the posterior probability for $a^{FG}$ forms a $K \times J$ matrix, which, when multiplied, forms an $I \times J$ matrix for $a^{FE}$. In some implementations, a column is prepended to the GE matrix corresponding to the case where k=0. This probability, $P(a_k^{GE}=1)$ when k=0 is not assigned by the alignment model and is used to account for the probability of an empty word alignment. The number of empty word alignments between a given source and target language can vary depending on the bridge language. Consequently, the empty word alignment can be controlled by specifying a value for a parameter $\epsilon$ when i=0 and $(1-\epsilon)/i$ when $i \in \{1, 2, \ldots, I\}$. The parameter $\epsilon$ controls a number of empty alignments. A higher value allows more empty alignments. The value of $\epsilon$ can be specified, e.g., to have a value of 0.5.

The resulting posterior probability can be maximized (e.g., using $a_{MAP}$) in order to determine the most likely alignment probability.

The alignment for the source and target language as a posterior probability matrix FE can be obtained as a function of a number of different bridge languages in a similar manner as described above for the German bridge language G. For example, for a French source language and an English target language, bridge languages of German, Spanish, Russian, and Chinese can each be used such that a particular alignment from French to English can be determined as a function of each particular bridge language.

The system optionally determines 308 a combined alignment between the source and target languages using more than one bridge language. The word alignment posterior probabilities described above can be used to generate a combined word alignment using multiple bridge languages.

Specifically, if translations exist in N bridge languages $G_1$, $G_2$, ..., $G_N$, a posterior probability matrix for FE can be generated using each of the bridge languages. Additionally, the posterior probability matrix for FE can be generated directly without using a bridge language. The N+1 posterior matrices can be combined as:

$$P(a_j^{FE} = i \mid e, f) = \sum_{l=0}^{N} P(B = G_l) P(a_j^{FE} = i \mid G_l, e, f),$$

where the variable B indicates the bridge language, $B \in \{G_0, G_1, \ldots G_N\}$, with $G_0$ representing a case where no bridge language is used and $G_1, \ldots, G_N$ representing particular languages e.g., German, Spanish, Chinese. Additionally, $P(a_j^{FE}=i|G_1, e, f)$ is the posterior probability where the bridge language $B=G_1$. The probabilities $P(B=G_1)$ sum to one over $l \in \{0, 1, 2, \ldots, N\}$ and represent the prior probability of bridge language 1. In some implementations, a uniform prior probability is used. For example, $P(B=G_l)=1/(N+1)$. In some implementations, different bridge languages can be associated with particular weights, which are indicative of the quality of the alignment produced given one bridge language over another.

Using the above formula for combining posterior probabilities, the system interpolates the posterior probability matrices and then calculates the corresponding MAP word alignment.

Figure 4:
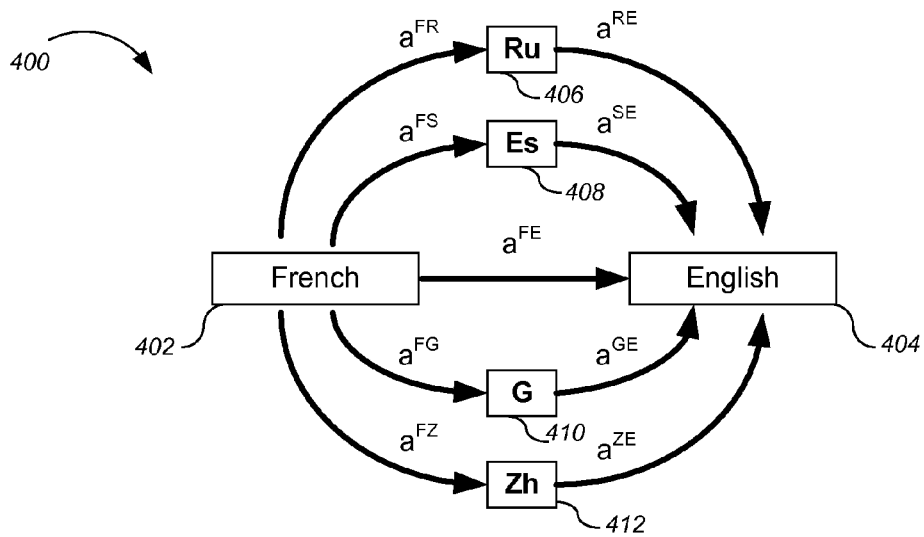
FIG. 4 illustrates bridge alignments between a source sentence and a translated sentence.

FIG. 4 is a block diagram illustrating bridge alignments 400 between a source sentence and a translated sentence. In FIG. 4, alignments between a French source language 402 and an English target language 404 are shown. A direct alignment $a^{FE}$ provides the word alignment directly from French to English. Additionally, bridge languages are used to form alignments $a^{FE}$ as a function of the corresponding bridge languages. In particular, FIG. 4 shows bridge languages Russian 406, Spanish 408, German 410, and Chinese 412.

As shown in FIG. 3, the system uses 310 each alignment to determine candidate translations. Thus, for an input sentence in a source language, a number of candidate translated sentences in the target language can be generated according to each alignment. For example, a first candidate can be generated using the direct alignment (e.g., for a given input string a candidate string can be generated based using the translation model according to the direct alignment and language model). One or more additional candidates can be generated using alignments derived from a particular bridge language. Additionally, in some implementations, a combined alignment is generated and also used to generate a candidate translation.

The system determines 312 a consensus translation using the candidate translations. The various candidate translations are assessed to determine a consensus translation. For example, given a set of translations, the system selects the translation that has the highest consensus (under BLEU score) with respect to the candidate translations. Consequently, a single translation is produced from the various candidates, which represents a best translation of the source sentence into the target sentence. An example technique for selecting a consensus translation from candidate translations is described in W. Macherey and F. Och "An Empirical Study on Computing Consensus Translations From Multiple Machine Translation Systems," *EMNLP, Prague, Czech Republic,* 2007, which is incorporated by rerference. Additionally, a general technique for selecting from candidate hypothesis in speech recognition is described in J. G. Fiscus, "A Post-Processing System to Yield Reduced Word Error Rates: Recognizer Output Voting Error Reduction (ROVER)," *Proceedings IEEE Workshop on Automatic Speech Recognition and Understanding,* pages 347-352, Santa Barbara, Calif. 1997.

Figure 5:
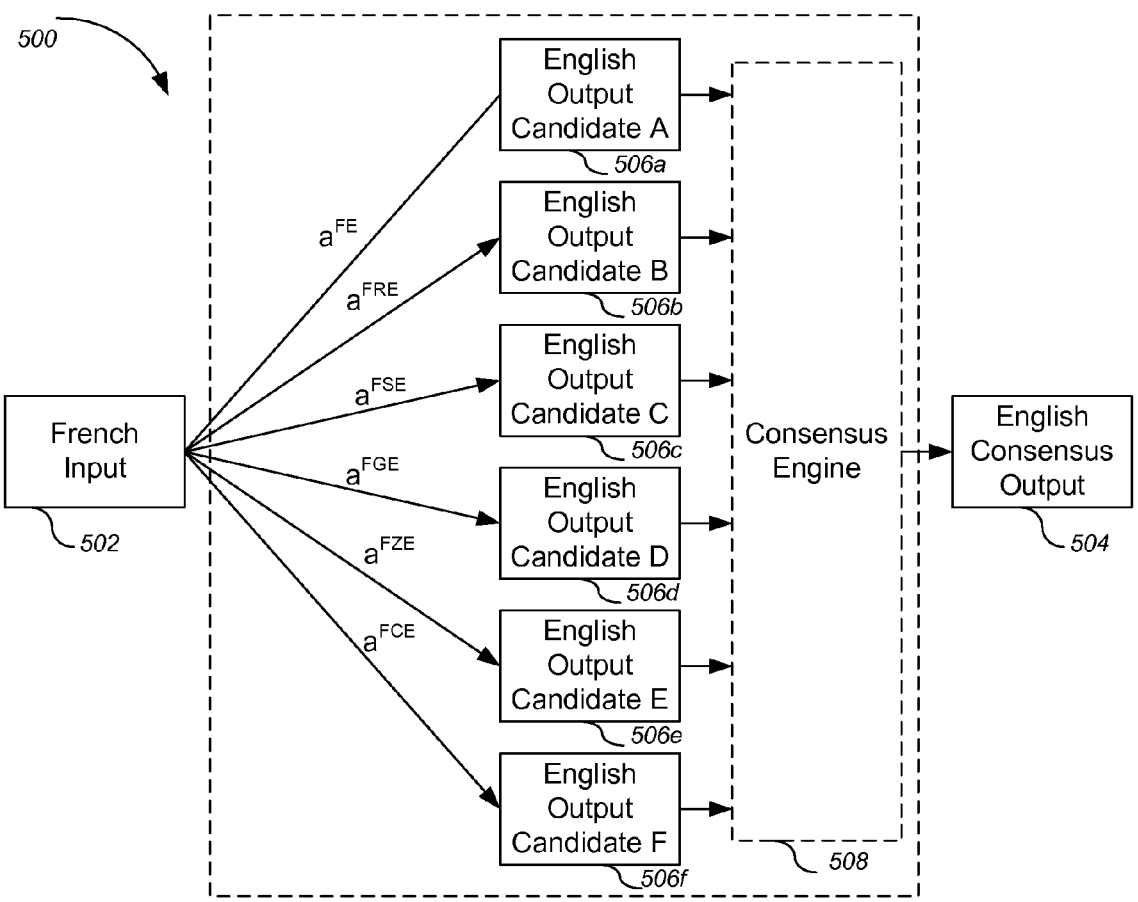
FIG. 5 is a block diagram showing an example of translation using bridge languages.

FIG. 5 is a block diagram illustrating an example of a translation system 500 using bridge languages. In FIG. 5, a French input sentence 502 is used by the translation system 500 to produce an English consensus output sentence 504. The translation system 500 using a number of different French-English alignments to generate a number of different English output candidates 506a-f. For example, $a^{FGE}$ represents an alignment using a German bridge language and $a^{FCE}$ represents an alignment using a combined bridge alignments. Each of the English output candidates 506 are input into a consensus engine 508. The consensus engine selects a best output sentence as the English consensus output sentence 504.

In some implementations, training can identify particular bridge languages that provide better alignment results than other bridge languages. For example, when translating from an Arabic source language to an English target, alignments can be tested and it can be determined that Spanish provides the best alignment for Arabic-English while Chinese provides the worst alignment results. Alignment quality can be measured, for example, in terms of precision, recall, and alignment error rate.

Translation quality can be assessed for the bridge languages, for example, by calculating Bilingual Evaluation Understudy ("BLEU") scores for translation results using each bridge alignment relative to a direct alignment between a source and a target language. For example, the resulting translation can be compared with a known translation to derive a BLEU score representing the quality of the translation. BLEU scores are described, for example, in Papineni, K., Roukos, S., Ward, T., and Zhu, W. J. (2002). "BLEU: A Method for Automatic Evaluation of Machine Translation" in *ACL*-2002: 40*th Annual meeting of the Association for Computational Linguistics* pp. 311-318, which is incorporated by reference. In some implementations, particular bridge languages or combinations of bridge languages can be identified as providing improved translation quality for a given source and target language over the translation quality of a direct alignment.

Figure 6:
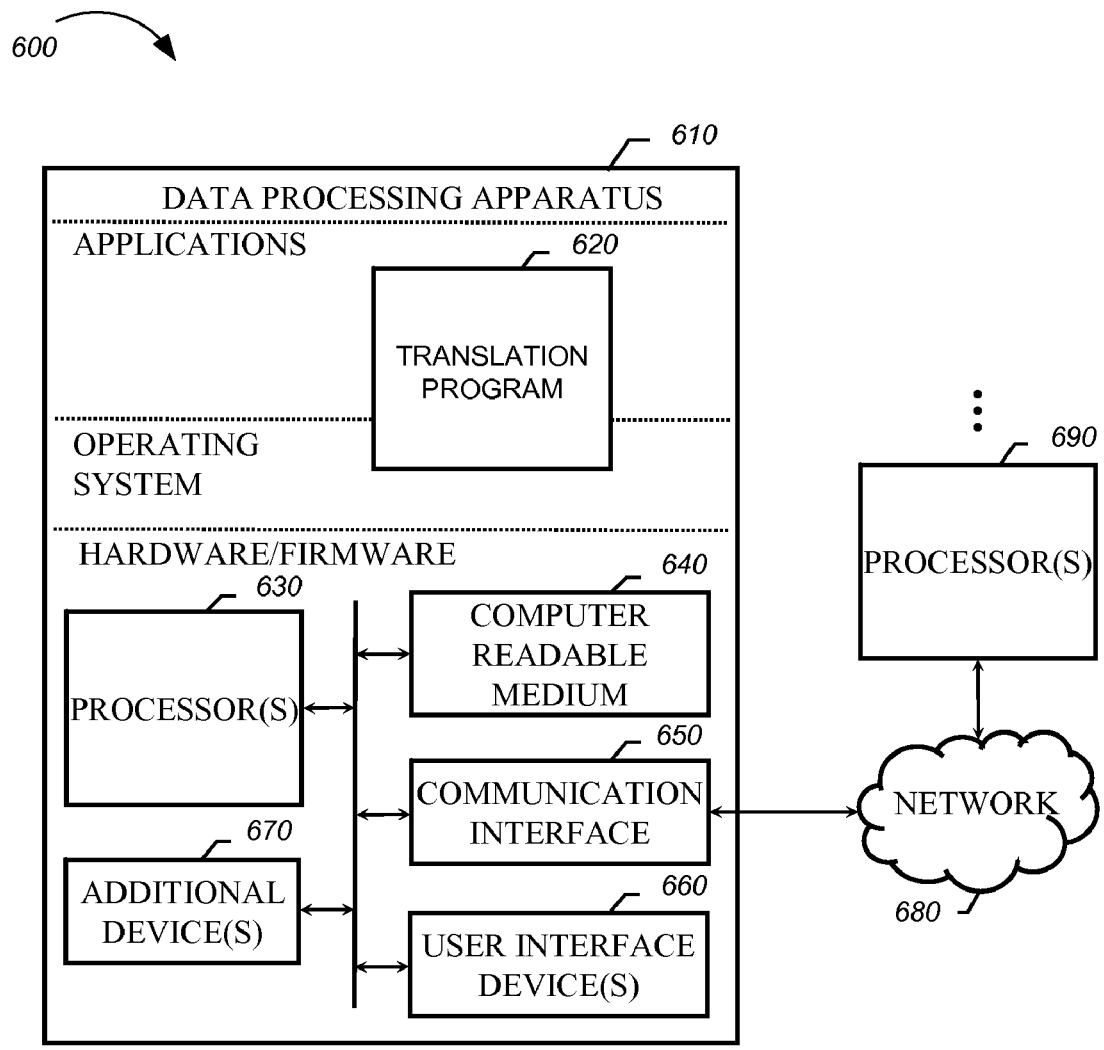
FIG. 6 is an example system for providing translations.

FIG. 6 is an example system 600 for providing translations. A data processing apparatus 610 can include hardware/firmware, an operating system and one or more programs, including translation program 620. The translation program 620 operates, in conjunction with the data processing apparatus 610, to effect the operations described in this specification. Thus, the translation program 620, in combination with one or more processors and computer-readable media (e.g., memory), represents one or more structural components in the system 600.

The translation program 620 can be a translation processing application, or a portion. As used here, an application is a computer program that the user perceives as a distinct computer tool used for a defined purpose. An application can be built entirely into the operating system (OS) of the data processing apparatus 610, or an application can have different components located in different locations (e.g., one portion in the OS or kernel mode, one portion in the user mode, and one portion in a remote server), and an application can be built on a runtime library serving as a software platform of the apparatus 610. Moreover, application processing can be distributed over a network 680 using one or more processors 690.

The data processing apparatus 610 includes one or more processors 630 and at least one computer-readable medium 640 (e.g., random access memory, storage device, etc.). The data processing apparatus 610 can also include a communication interface 650, one or more user interface devices 660, and one or more additional devices 670. The user interface devices 660 can include display screens, keyboards, mouse, stylus, or any combination thereof.

Once programmed, the data processing apparatus 610 is operable to identify bridge alignments between a source and a target language using one or more bridge languages. Additionally, one or more of the bridge alignments can be used to perform a translation between the source and the target languages.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving multi-lingual parallel text associating a source language, a target language, and one or more bridge languages;
determining a direct alignment between the source language and the target language, wherein the direct alignment represents a word-for-word connection between source language and target language words;
determining, using one or more computing devices, a first bridge-based alignment between the source language and the target language using a first bridge language that is distinct from the source language and the target language, wherein the first bridge-based alignment is determined based in part on a first posterior probability matrix for a first alignment from the source language to the first bridge language and a second posterior probability matrix for a second alignment from the first bridge language to the target language;
using the direct alignment between the source language and the target language to generate a first candidate translation of an input text in the source language to the target language;
using the first bridge-based alignment to generate a second candidate translation of the input text in the source language to the target language; and
determining a consensus translation using the candidate translations.

2. The method of claim 1, where determining the first bridge-based alignment using the first bridge language includes:
determining a first alignment between the source language and the first bridge language;
determining a second alignment between the first bridge language and the target language; and
determining the first bridge-based alignment between the source language and the target language using the first and second alignments.

3. The method of claim 2, further comprising:
determining a combined alignment using two or more bridge-based alignments determined using two or more bridge languages; and
using the combined alignment to generate a candidate translation of the input text.

4. The method of claim 3, wherein determining a combined alignment includes using the combining posterior probability matrices for each bridge language according to:

$$P(a_j^{FE} = i \mid e, f) = \sum_{l=0}^{N} P(B = G_l) P(a_j^{FE} = i \mid G_l, e, f),$$

where B indicates the bridge language, $B \in \{G_0, G_1, \ldots, G_N\}$, with $G_0$ representing the direct alignment without a bridge language and $G_1, \ldots, G_N$ representing particular languages and where $P(a_j^{FE} = i \mid G_l, e, f)$ is the posterior probability where the bridge language $B = G_l$.

5. The method of claim 2, where determining the first bridge-based alignment using the first bridge language further comprises:
determining a first posterior probability matrix associated with an alignment from the source language to the first bridge language;
determining a second posterior probability matrix associated with an alignment from the first bridge language to the target language;
determining a third posterior probability matrix associated with an alignment from the source language to the target language as a function of the first posterior probability matrix and the second posterior probability matrix; and
identifying a maximum alignment probability using the third posterior probability matrix.

6. The method of claim 1, further comprising:
determining a plurality of bridge-based alignments between the source language and the target language using a plurality of respective bridge languages.

7. The method of claim 6, further comprising:
using each of the determined plurality of bridge-based alignments to generate respective candidate translations of the input text.

8. The method of claim 1, where determining a consensus translation using the candidate translations includes evaluating a score for each candidate translation.

9. The method of claim 1, where determining the alignment using the first bridge language includes calculating:

$$P(a_j^{FE} = i \mid e, f) = \sum_{k=0}^{K} P(a_j^{FG} = k \mid g, f) P(a_k^{GE} = i \mid g, e),$$

where $P(a_j^{FE}=i|e, f)$ is the posterior probability matrix for the alignment from the source language to the target language and $P(a_j^{FG}=k|g, f)P(a_k^{GE}=i|g, e)$ represent posterior probability matrices for a first alignment from the source language to the first bridge language and for a second alignment from the first bridge language to the target language.

10. A computer program product, encoded on a non-transitory computer-readable medium, operable to cause data processing apparatus to perform operations comprising:
   identifying multi-lingual parallel text associating a source language, a target language, and one or more bridge languages;
   determining a direct alignment between the source language and the target language, wherein the direct alignment represents a word-for-word connection between source language and target language words;
   determining a first bridge-based alignment between the source language and the target language using a first bridge language that is distinct from the source language and the target language, wherein the first bridge-based alignment is determined based in part on a first posterior probability matrix for a first alignment from the source language to the first bridge language and a second posterior probability matrix for a second alignment from the first bridge language to the target language;
   using the direct alignment between the source language and the target language to generate a first candidate translation of an input text in the source language to the target language;
   using the first bridge-based alignment to generate a second candidate translation of the input text in the source language to the target language; and
   determining a consensus translation using the candidate translations.

11. The computer program product of claim 10, where determining the first bridge-based alignment using the first bridge language includes:
   determining a first alignment between the source language and the first bridge language;
   determining a second alignment between the first bridge language and the target language; and
   determining the first bridge-based alignment between the source language and the target language using the first and second alignments.

12. The computer program product of claim 11, further comprising:
   determining a combined alignment using two or more bridge-based alignments determined using two or more bridge languages; and
   using the combined alignment to generate a candidate translation of the input text.

13. The computer program product of claim 11, where determining the first bridge-based alignment using the first bridge language further comprises:
   determining a first posterior probability matrix associated with an alignment from the source language to the first bridge language;
   determining a second posterior probability matrix associated with an alignment from the first bridge language to the target language;
   determining a third posterior probability matrix associated with an alignment from the source language to the target language as a function of the first posterior probability matrix and the second posterior probability matrix; and
   identifying a maximum alignment probability using the third posterior probability matrix.

14. The computer program product of claim 10, further comprising:
   determining a plurality of bridge-based alignments between the source language and the target language using a plurality of respective bridge languages.

15. The computer program product of claim 14, further comprising:
   using each of the determined plurality of bridge-based alignments to generate respective candidate translations of the input text.

16. The computer program product of claim 10, where determining a consensus translation using the candidate translations includes evaluating a score for each candidate translation.

17. A system comprising:
   one or more computing devices operable to perform operations including:
   identifying multi-lingual parallel text associating a source language, a target language, and one or more bridge languages;
   determining a direct alignment between the source language and the target language wherein the direct alignment represents a word-for-word connection between source language and target language words;
   determining a first bridge-based alignment between the source language and the target language using a first bridge language that is distinct from the source language and the target language, wherein the first bridge-based alignment is determined based in part on a first posterior probability matrix for a first alignment from the source language to the first bridge language and a second posterior probability matrix for a second alignment from the first bridge language to the target language;
   using the direct alignment between the source language and the target language to generate a first candidate translation of an input text in the source language to the target language;
   using the first bridge-based alignment to generate a second candidate translation of the input text in the source language to the target language; and
   determining a consensus translation using the candidate translations.

18. The system of claim 17, where determining the first bridge-based alignment using the first bridge language includes:
   determining a first alignment between the source language and the first bridge language;
   determining a second alignment between the first bridge language and the target language; and
   determining the first bridge-based alignment between the source language and the target language using the first and second alignments.

19. The system of claim 18, further operable to perform operations comprising:
- determining a combined alignment using two or more bridge-based alignments determined using two or more bridge languages; and
- using the combined alignment to generate a candidate translation of the input text.

20. The system of claim 18, where determining the first bridge-based alignment using the first bridge language further comprises:
- determining a first posterior probability matrix associated with an alignment from the source language to the first bridge language;
- determining a second posterior probability matrix associated with an alignment from the first bridge language to the target language;
- determining a third posterior probability matrix associated with an alignment from the source language to the target language as a function of the first posterior probability matrix and the second posterior probability matrix; and
- identifying a maximum alignment probability using the third posterior probability matrix.

21. The system of claim 17, further operable to perform operations comprising:
- determining a plurality of bridge-based alignments between the source language and the target language using a plurality of respective bridge languages.

22. The system of claim 21, further operable to perform operations comprising:
- using each of the determined plurality of bridge-based alignments to generate respective candidate translations of the input text.

23. The system of claim 17, where determining a consensus translation using the candidate translations includes evaluating a score for each candidate translation.

* * * * *